No. 805,584. PATENTED NOV. 28, 1905.
F. RUMP.
RANGE FINDER.
APPLICATION FILED JUNE 17, 1905.
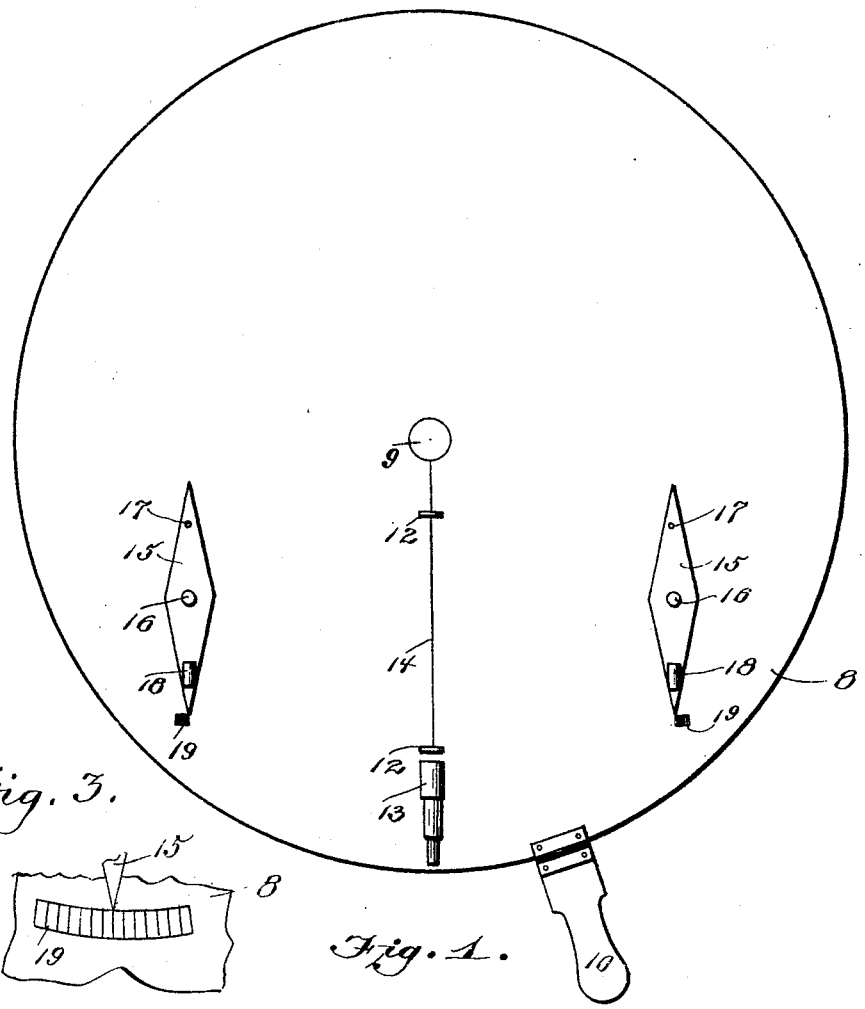
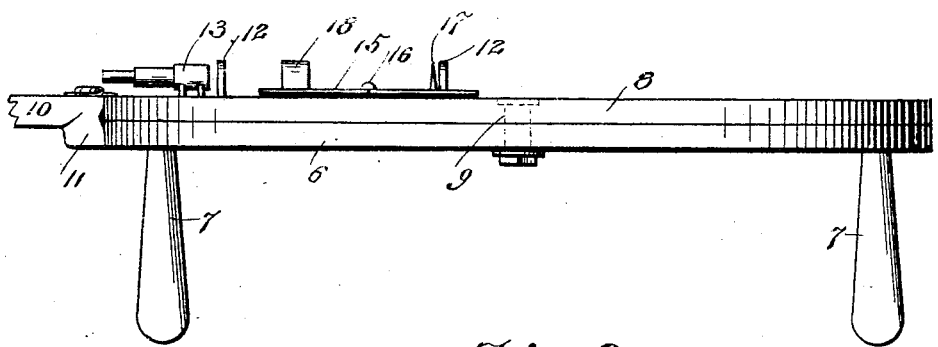
Witnesses
M. A. Schmidt
Geo. E. Tew
Inventor
Friederich Rump.
by Milo B. Stevens & Co.
Attorneys.

UNITED STATES PATENT OFFICE.

FRIEDERICH RUMP, OF CHEBOYGAN, MICHIGAN.

RANGE-FINDER.

No. 805,584.      Specification of Letters Patent.      Patented Nov. 28, 1905.

Application filed June 17 1905. Serial No. 265,819.

*To all whom it may concern:*

Be it known that I, FRIEDERICH RUMP, a citizen of the United States, residing at Cheboygan, in the county of Cheboygan and State of Michigan, have invented new and useful Improvements in Range-Finders, of which the following is a specification.

This invention is an instrument for finding or indicating ranges or distances, and has for its object to provide a simple device for indicating approximately the distance of a given object from the point of observation.

The invention is illustrated in the accompanying drawings, Figure 1 being a plan view and Fig. 2 a side view. Fig. 3 is an enlarged detail showing one of the scales upon which the distance is indicated.

Referring specifically to the drawings, 6 indicates a stand mounted upon legs 7. This stand is circular in shape and acts to support a rotatable disk or plate 8, which is pivoted to the stand at the center, as at 9. The rotary plate is also circular in outline and is of the same size or diameter as the stand 6. The plate may be turned upon the stand by means of the handle 10, which is hinged to the plate at the edge thereof and has a depending portion 11, which may be pressed in contact with the edge of the stand 6 and when so pressed down acts to hold the plate in adjusted position. Mounted upon the plate are two sights 12 and a telescope or glass 13, these being in line with the diameter or center line 14 and by means of which the diameter or center line is pointed at the object whose distance is to be measured. On each side of the center line and equidistant therefrom are pointers 15, pivoted at 16. These pointers carry a sight 17 and a glass 18, and a scale of distances 19 is marked on the plate adjacent the rear end of each pointer. The device is first set or scaled by measurements of known distances—that is, the marks of various distances to be placed on the scale 19 are found by sighting the middle glass 13 and the pointers 15 upon some object at a known distance from the device. Such distance is then marked upon the scales. In the same way other distances are found and marked to the number desired. If then it be desired to find the distance of any object, the plate is set and the glass 13 and line 14 sighted upon the object. Then by turning either or both of the pointers 15 until their sights register with the same object the rear end of the pointers will indicate on the scales 19 the distance of the object.

The stand and plate are made as large as convenient, so as to give a wide base for the triangulation.

The device will be found useful in determining quickly the approximate range or distance of one object from another.

What I claim as new, and desire to secure by Letters Patent, is—

A device for measuring distances, comprising a stand having a circular top, a plate pivoted upon the top and having a handle hinged thereto and arranged to engage the edge of the top to hold the plate as set, a scale marked on the plate, a fixed sighting device upon the plate, and a movable sighting device upon the plate having an index coöperating with the said scale.

In testimony whereof I have signed my name to this specification in the presence of two subscribing witnesses.

FRIEDERICH RUMP.

Witnesses:
    JNO. E. FROST,
    MABEL G. TRAIN.